United States Patent [19]

Takizawa

[11] Patent Number: 4,732,125

[45] Date of Patent: Mar. 22, 1988

[54] INTERNAL COMBUSTION ENGINE OUTPUT TORQUE CONTROL SYSTEM

[75] Inventor: Satoshi Takizawa, Yokosuka, Japan

[73] Assignee: Nissan Motor Company, Limited, Yokohama, Japan

[21] Appl. No.: 773,003

[22] PCT Filed: Dec. 28, 1984

[86] PCT No.: PCT/JP84/00631

§ 371 Date: Aug. 29, 1985

§ 102(e) Date: Aug. 29, 1985

[30] Foreign Application Priority Data

Dec. 29, 1983 [JP] Japan ................................ 58-245993
Dec. 29, 1983 [JP] Japan ................................ 58-245994
Dec. 29, 1983 [JP] Japan ................................ 58-245997

[51] Int. Cl.[4] .............................................. F02P 5/15
[52] U.S. Cl. ................................. 123/422; 123/339; 123/423; 123/424
[58] Field of Search ............... 123/339, 415, 416, 417, 123/418, 422, 423, 424

[56] References Cited

U.S. PATENT DOCUMENTS

| 4,328,775 | 5/1982 | Ironside | 123/339 |
|---|---|---|---|
| 4,509,477 | 4/1985 | Takao et al. | 123/339 |
| 4,517,945 | 5/1985 | Ishigami et al. | 123/425 |
| 4,517,952 | 5/1985 | Hosoya | 123/638 |
| 4,552,109 | 11/1985 | Boccadoro et al. | 123/339 |
| 4,582,032 | 4/1986 | Hara et al. | 123/339 |
| 4,640,249 | 2/1987 | Kawamura et al. | 123/425 |
| 4,640,250 | 2/1987 | Hosaka et al. | 123/425 |
| 4,658,787 | 4/1987 | Takizawa | 123/418 |
| 4,658,789 | 4/1987 | Morita | 123/422 |
| 4,660,535 | 4/1987 | Asano | 123/425 |

Primary Examiner—Andrew M. Dolinar
Attorney, Agent, or Firm—Schwartz, Jeffery, Schwaab, Mack, Blumenthal & Evans

[57] ABSTRACT

An output torque control system capable of control the internal combustion engine output torque in fast response to an engine load change. The ignition timing is controlled in a manner to reduce the difference between the actual torque and the demand torque, the difference being cause by an engine load change. The demand torque and the actual torque are calculated in accordance with preselected engine operating parameters such as engine rotation frequency. A corrected torque value is calculated based upon the demand torque and the actual torque. An ignition advance correction value which corresponds to the correction value is calculated. The engine ignition timing is corrected for the advance correction value so as to provide an engine output torque equal to the demand torque.

8 Claims, 20 Drawing Figures

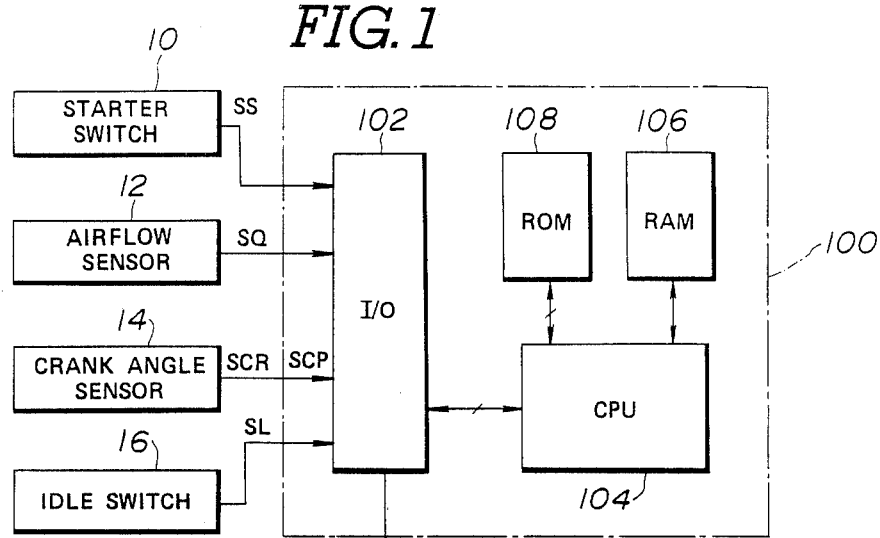
FIG. 1
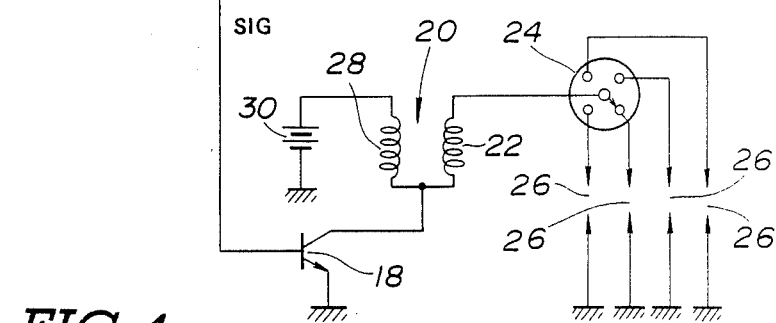
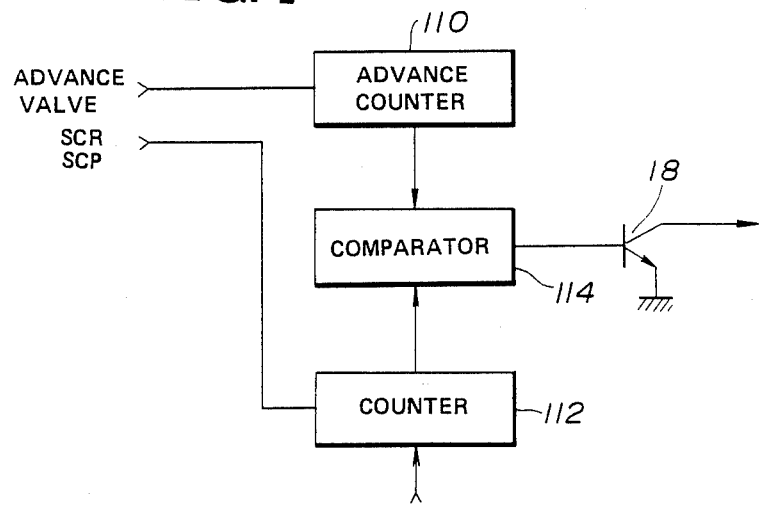
FIG. 4

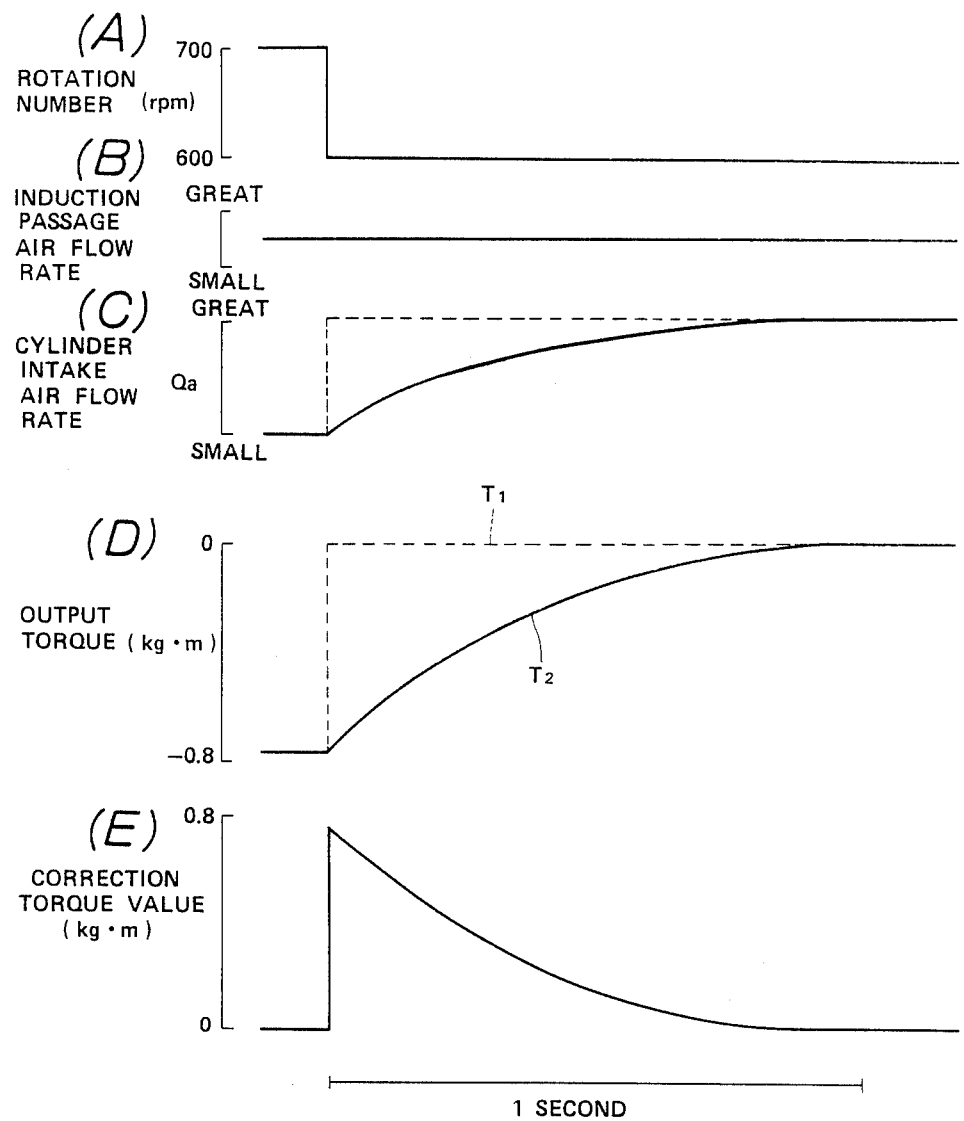

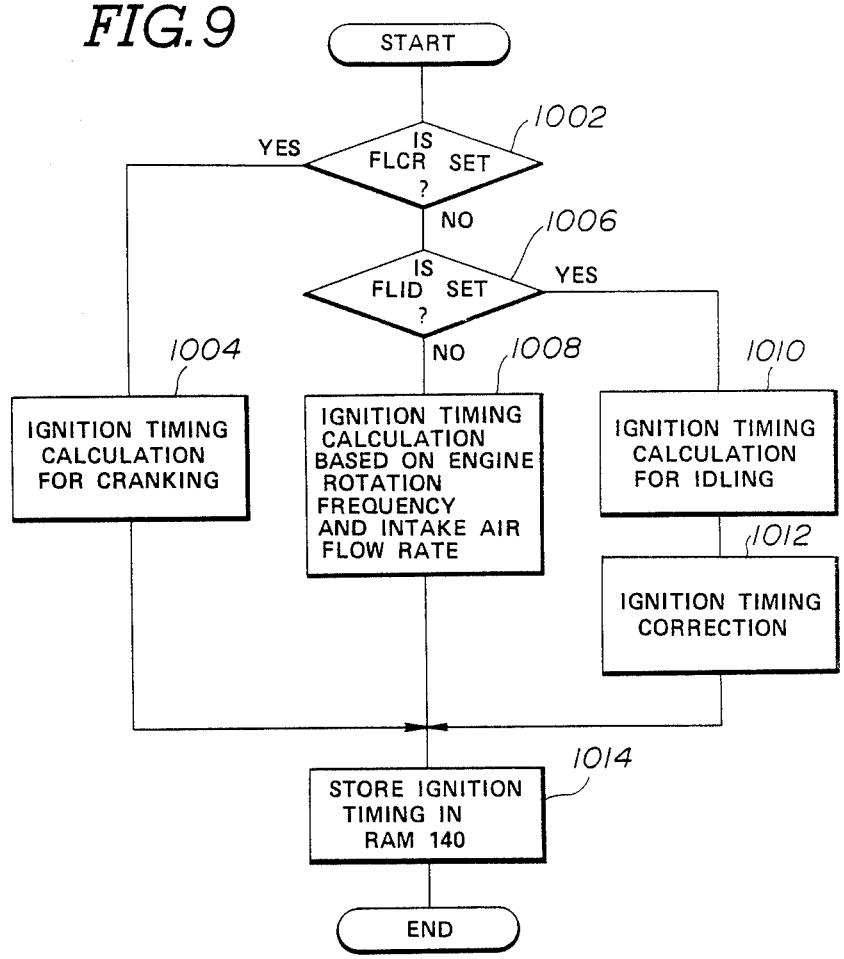
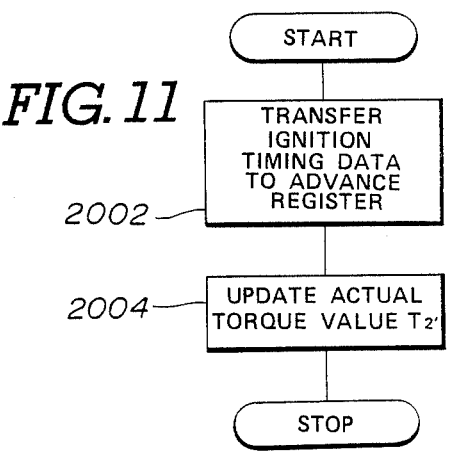

INTERNAL COMBUSTION ENGINE OUTPUT TORQUE CONTROL SYSTEM

FIELD OF THE INVENTION

This invention relates to an output torque control system for controlling the output torque of an internal combustion engine in accordance with engine load and, more particularly, to an output torque control system which can improve the response time of engine output torque control with respect to engine load variations during idling, coasting or other engine operating conditions where the throttle valve is fully closed or at an angle less than a predetermined value.

PRIOR ART

As well known in the art, the output torque of an internal combustion engine is dependent upon the amount of fuel to the engine, the amount of air to the engine, engine rotation frequency, ignition timing and other engine operating parameters. On the other hand, the torque demanded for the engine is dependent upon engine acceleration and other engine operating conditions and also the conditions of operation of accessories such as an air conditioner.

When the throttle valve is fully closed or at an angle less than a predetermined value, the engine load is substantially zero or less and thus the torque demanded for the engine is small. Under this condition, the air flow through the main intake passage connected through a throttle chamber to the respective cylinders of the engine is a sonic flow the rate of which is constant, and the engine rotation frequency varies in accordance with the amount of air flow through an auxiliary air passage. The amount of air flow through the auxiliary air passage is controlled in accordance with engine operating conditions including engine load and the conditions of operation of the accessories such as an air conditioner. Such an auxiliary air induction control system is disclosed, for example, in U.S. Pat. Nos. 4,365,599, 4,406,261, 4,345,557, 4,402,289, 4,406,262, and 4,344,398, all of which are granted to Kenji Ikeura. In these U.S. patents granted to Ikeura, the amount of air through the auxiliary air passage is controlled by means of an auxiliary air control valve (AAC) which is controlled by an electrically controlled vacuum control modulaor valve (VCM).

On the other hand, it is the conventional engine control practice to control the ignition timing as a function of engine rotation frequency and induction passage air flow rate during engine normal operation and as a function of engine rotation frequency during engine idle operation where the rate of air flow through the induction passage is substantially constant. When, under such a condition, the position of the transmission and/or the clutch is changed or the air conditioner switch is turned on, the engine load changes and the engine rotation frequency changes with a change of demanded torque. The amount of air delivered to the engine changes with a time lag relative to an engine rotation frequency change due to the influence of induction passage volume and cylinder stroke volume. During a transition where the amount of air delivered to the engine changes with an engine rotation frequency change, the torque demanded for the engine is not in coincidence with the actual torque, resulting in unstable engine operating conditions.

SUMMARY OF THE INVENTION

The primary object of the present invention is to provide an engine torque control system which is free from difficulties attendant upon the conventional engine torque control systems and has an improved response time relative to an engine load change.

It is a second and more specified object of the present invention to provide an engine torque control system which can control the ignition timing in accordance with a change of the torque demanded for the engine in a manner to improve the transition response time when the engine load varies.

It is another specified object of the present invention to provide an engine torque control system which has an improved response time relative to an engine load change at engine idling and other engine operating conditions where the throttle valve is fully closed or at an angle less than a predetermined value.

It is still another object of the present invention to provide an engine output torque control method which controls the ignition timing in accordance with engine load a idling conditions.

The above and other objects of the present invention are achieved, in accordance with the present invention, by an internal combustion engine output torque control system which includes means for detecting the actual torque actually produced on the engine, means for calculating a value for the torque demanded for the engine or the ideal torque, and means for modifying the ignition timing in accordance with a difference between the actual torque and the demand torque to advance and retard the ignition timing so as to control the engine output torque to the demand torque. The actual torque and the demand torque are calculated as a function of engine rotation frequency.

In the present invention, the engine actual torque and the engine demand or ideal torque are calculated by locking up a table which defines a value for the actual or demand torque as a function of engine rotation frequency or as a function of engine rotation frequency and the amount of air delivered to the engine. Alternatively, a value corresponding to a deviation value between of actual torque and the demand torque as a function of engine rotation frequency and the weighted or moving average of the engine rotational frequency.

BRIEF DESCRIPTION OF THE DRAWINGS

In the drawings:

FIG. 1 is a schematic block diagram showing an internal combustion engine ignition system to which one embodiment of a control system of the present invention is applied;

FIG. 4 is a block diagram used in explaining the system which controls the ignition advance of the ignition system;

FIG. 7 contains waveforms A to E used in explaining the manner where the engine is corrected in accordance with engine rotation frequency in the output torque control system of FIG. 6;

FIG. 9 is a flow chart of the program executed by the control circuit of FIG. 8 in correcting the ignition timing;

FIG. 11 is a flow chart of the program executed by the control circuit of FIG. 8 in controlling the ignition timing;

PREFERRED EMBODIMENTS OF THE INVENTION

Figure 2:
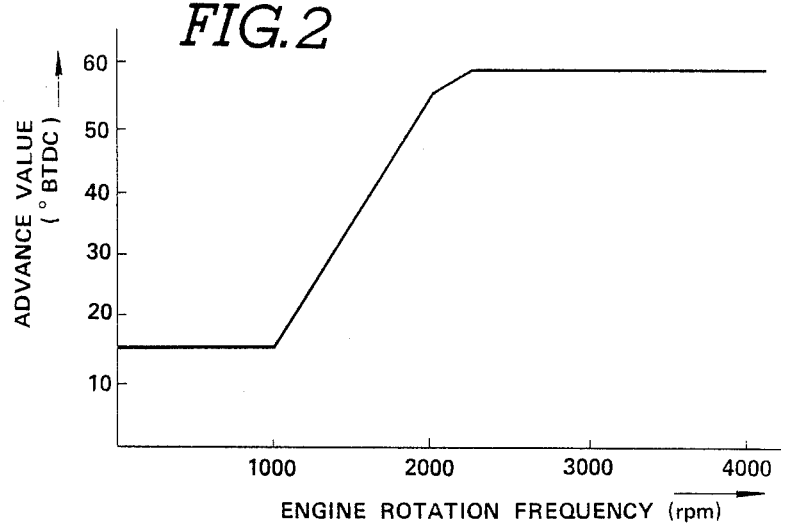
FIG. 2 is a chart showing the relationship between engine rotation frequency and ignition advance.

FIG. 1 illustrates one example of internal combustion engine ignition control systems to which the engine output torque control system of the present invention is applied.

The ignition control system includes a controller 100 which comprises a microprocessor. The microprocessor includes an input/output interface (I/O) 102, a CPU 104, a RAM 106, and a ROM 108.

The input/output interface 102 is connected to a starter switch 10, an airflow sensor 12, a crank angle sensor 14, and an idle switch 16. The starter switch 10 is turned on and it produces a starter signal SS having a high level during engine cranking. The airflow sensor 12 may be of a conventional flap type, vortex flow type, hot wire type, or the like and is normally provided in the induction passage (not shown) upstream of the throttle chamber (not shown) in which the throttle valve (not shown) is placed. The airflow sensor produces an intake air signal SQ corresponding to the amount of air flow through the induction passage. The crank angle sensor 14 produces a crank reference position signal SCR and a crank angle signal SCP. As well known in the art, the crank reference position signal indicates the top dead center position of the piston of each cylinder. The crank angle signal is generated for each rotation of the crankshaft and it has a frequency directly proportional to the engine rotational frequency. The idle switch 16 includes a throttle fully closed switch and produces an idle signal SI when the throttle valve is fully closed or at an angle less than a predetermined value.

The controller 100 calculates a value for the existing engine rotation frequency N in response to the crank angle signal SCP. At an idling condition where the throttle valve is at an angle less than a predetermined value, the ignition advance is determined by looking up a two-dimensional advance table of FIG. 2 which defines a desired ignition advance value as a function of engine rotation frequency N. During normal operation, the ignition advance is determined by looking up a three-dimensional advance table of FIG. 3 which defines a desired ignition advance value as a function of engine rotation frequency and intake air flow rate, that is, the amount of air delivered to the engine per one engine rotation. Either of the two-dimensional table of FIG. 2 and the three-dimensional table of FIG. 3 is selected in accordance with the level of the idle signal fed from the idle switch 16. The two-dimensional table is selected when the idle signal is at a high level and the three-dimensional table is selected when the idle signal is at its low level. The controller 100 determines an ignition advance from the engine rotation frequency N or the engine rotation frequency N and the intake air flow rate Q and an ignition timing in response to the crank reference position signal. The controller outputs an ignition signal SIG to a power transistor 18 included in the ignition circuit of the engine.

The ignition circuit also includes an ignition coil connected to the power transistor 18, a distributor 24 connected to the secondary winding 22 of the ignition coil 20, and an ignition plug 26 connected to the distributor. The primary winding 28 of the ignition coil 20 is connected to a power source 30. The power transistor 18 is turned off to induce a spark voltage on the secondary winding 22 of the ignition coil is a well known manner when it receives the ignition signal SIG. The distributor 24 distributes the spark voltage to the spark plugs of the respective cylinders in synchronism with engine rotation.

FIG. 4 is a schematic block diagram used in explaining the manner of the ignition timing control. The advance register 110 stores the advance value looked from the two-dimensional table or the three-dimensional table and produces a signal having a magnitude corresponding to the stored advance value. The counter 112 receives the crank reference position signal SCR and the crank angle signal SCP. The counter 112 is responsive to a crank reference position signal SCR to clear the count and start counting the crank angle signal SCP. The counter 112 outputs a counter signal having a magnitude corresponding to the count. The comparator 114 compares the signal fed from the advance register 110 with the counter signal and produces an ignition signal to the power transistor 18 when the magnitude of the counter signal reaches the magnitude of the register output signal.

Figure 5:
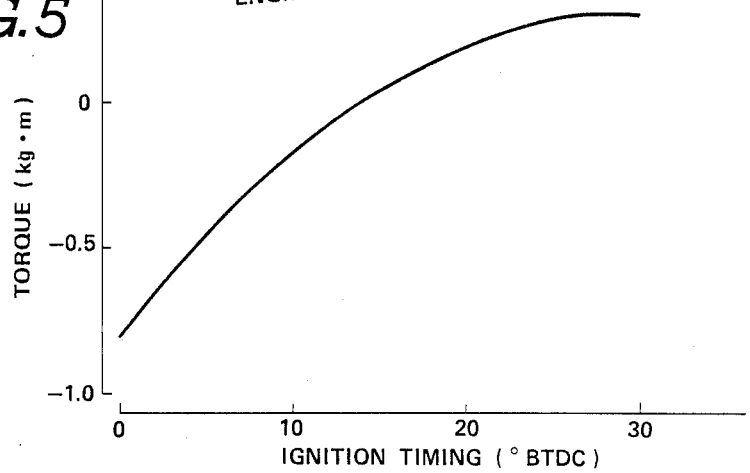
FIG. 5 is a graph showing the relationship between ignition advance and engine output torque.

FIG. 5 shows the relationship between engine output torque and advance value relative to BTDC. As can be seen from FIG. 5, the output torque increases as the ignition advance increases. It is, therefore, possible to increase the output torque by advancing the ignition timing.

Figure 6:
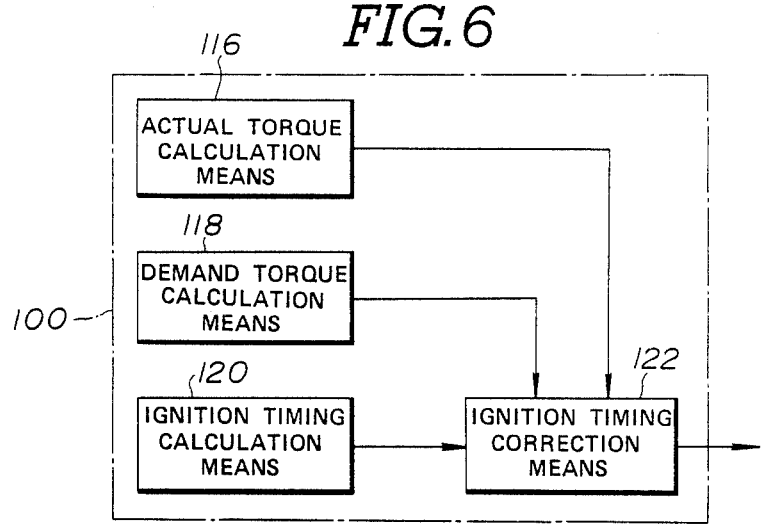
FIG. 6 is a block diagram used in explaining the function of the engine output torque control system of the first embodiment of the present invention.

FIG. 6 is a schematic block diagram used in explaining the function of the engine output torque control system of one embodiment of the present invention. According to the first embodiment of the present invention, the controller 100 comprises an actual torque calculation means 116, a demand torque calculation means 118, an ignition advance calculation means 120, and an ignition advance correction means 122.

The general explanation of the ignition advance correction made in the above embodiment is as follows. As the torque demanded for the engine increases, the engine rotation frequency decreases, as shown in FIG. 7(A). During idle engine operation where the throttle valve is at or near its closed position so that the flow through the induction passage is sonic, the amount of air through the induction passage is substantially constant, as shown in FIG. 7(B). Under this condition, as indicated by the solid line of FIG. 7(C), the amount of air introduced into each cylinder increases with a time lag relative to the demanded air amount indicated by the broken line of FIG. 7(C). As a result, the engine output increases with a time corresponding to the time lag of increase of the amount of air introduced into each cylinder, as indicated by the solid line of FIG. 7(D).

The result is that the actual torque increases with a time lag corresponding to the time lag of change of the amount of air introduced into each cylinder relative to the demand torque indicated by the broken line of FIG. 7(D). The difference between the actual torque and the demand torque varies, as shown in FIG. 7(E). It is, therefore, possible to vary the output torque in faster response to a demand torque change caused by an engine load change by advancing the ignition timing in a manner to provide an output torque corresponding to the difference between the actual torque and the demand torque as shown in FIG. 7(E).

The general explanation of the calculation of the difference between the demand torque and the actual torque is as follows. The difference will be referred hereinafter to as correction torque $\Delta T$. Fairly good approximations of the demand value $Qa1$ for engine cylinder air flow rate and the actual value $Qa2$ for engine cylinder air fow rate are provided as:

$$Qa1 = 2Q/CN \quad (1)$$

$$Qa2 = (1-\alpha) \times Qa2 + \alpha \times 2Q/CN \quad (2)$$

where C is the number of the cylinders, Qa2 is the engine cylinder air flow rate measured during one cycle of strokes of the piston, and $\alpha$ is a constant.

The constant $\alpha$ is represented as:

$$\alpha = n \times v/V \quad (3)$$

where n is the volumetric efficiency, v is the cylinder stroke volume, and V is the induction passage volume.

Since the torque T produced on the engine may be considered as being in direct proportion to the engine cylinder air flow rate Qa assuming that the air-fuel ratio is substantially constant, the difference (correction torque $\Delta T$) between the demand torque T1 and the actual torque T2 is in direct proportion to the difference between the engine cylinder air flow rate demand value Qa1 and the engine cylinder air flow rate actual value Qa2. In other words, the relationship among the correction torque $\Delta T$, the demand engine cylinder air flow rate Qa1, and the actual engine cylinder air flow rate Qa2 is as follows:

$$\Delta T \propto Qa1 - Qa2 \quad (4)$$

Thus, a desired advance value which is used to correct the ignition advance to obtain a correction torque can be calculated as a function of the difference between the demand air flow rate Qa1 and the actual air flow rate Qa2. In such a manner, the time lag of the engine cylinder air flow rate change during a transition can be compensated by correcting the ignition advance.

In the arrangement of FIG. 6, the demand torque calculation means 118 receives a signal indicative of the engine rotation frequency calculated from the crank position signal and the air flow rate indicative signal SQ from the airflow sensor 12, determines a value Tp corresponding to the engine load from the engine rotation frequency N and the air flow rate Q, and multiplies a predetermined constant K by the value to calculate a demand torque T1. Following this, the actual torque calculation means 116 calculates an actual torque T2 from the demand torque T1 and the actual torque T2' measured during the last cycle of strokes of the piston in accordance with the following equation:

$$T2 = (1-\alpha) \times T2' + \alpha \times T1 \quad (5)$$

Figure 3:
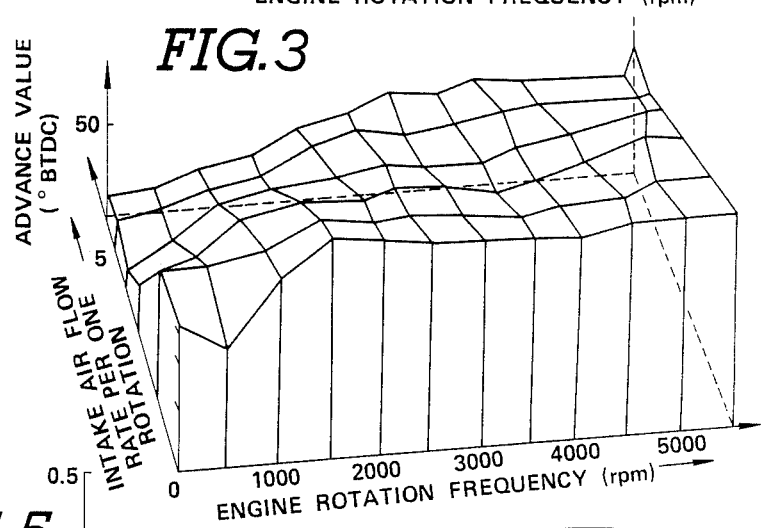
FIG. 3 is a schematic view showing a three-dimensional table used in calculating an ignition advance value as a function of engine rotation frequency and intake air flow rate.

On the other hand, the ignition advance calculation means 120 uses the advance table of FIG. 2 to determine an ignition advance value as a function of engine rotation frequency or the advance table of FIG. 3 to determine an ignition advance value as a function of engine rotation frequency and intake air flow rate. The advance value determined in the ignition advance calculation means 120 is fed, together with the demand torque value determined in the demand torque calculation means 118 and the actual torque value determined in the actual torque calculation means 116, to the ignition advance correction means 112 which thereby determines an ignition advance correction value corresponding to the difference (T1−T2) between the demand torque value and the actual torque value. The ignition advance correction means 122 provides the corrected advance value to the advance register 110 of FIG. 4 to update the value of the register.

The arrangement and operation of the output torque control system of the first embodiment of the present invention will be described with reference to FIGS. 8 to 12.

Figure 8:
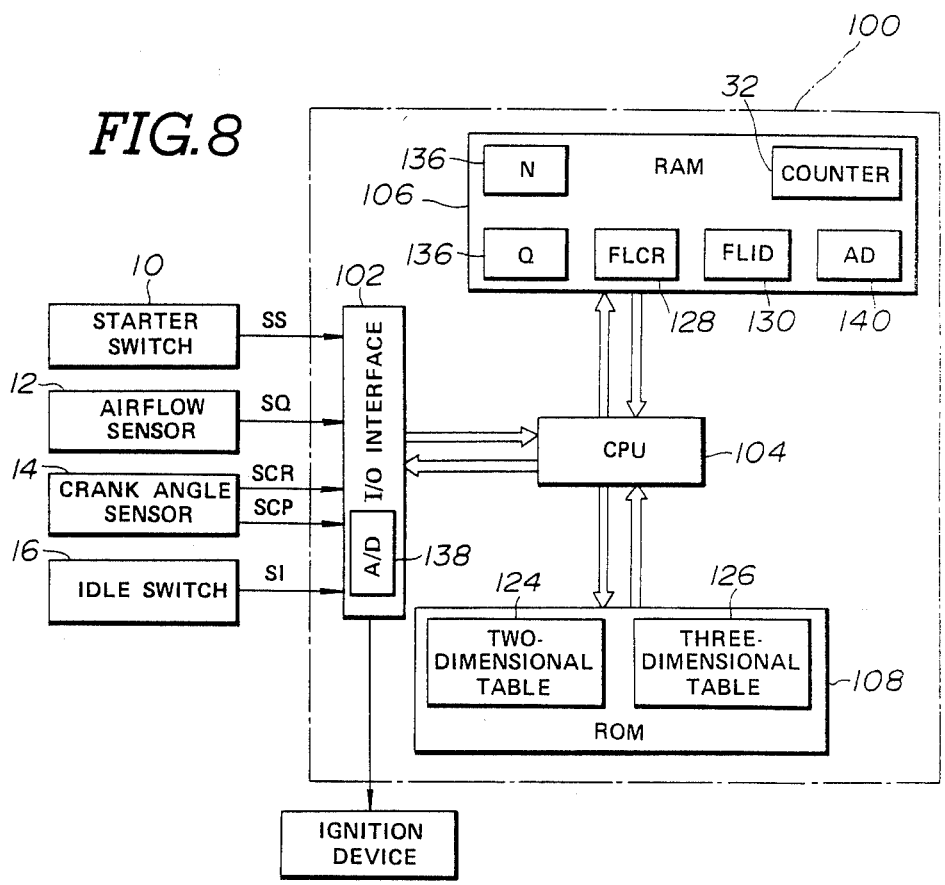
FIG. 8 is a block diagram showing the control circuit of the engine output torque control system of the first embodiment of FIG. 6.

FIG. 8 illustrates the arrangement of the controller 100 of the ignition timing control system of the first embodiment of the present invention. The memory sections 124 and 126 of the ROM 108 store the advance tables of FIGS. 2 and 3, respectively. The memory section 128 of the RAM 106 of the controller 100 functions as a flag register FLCR which is set in response to a starter signal SS generated when the starter switch 10 is turned ON and is reset when the starter switch 10 is turned OFF. The flag register remains in the set condition during engine cranking. The RAM 106 also includes a memory section 130 which functions as a flag register for an idling flag FLID. The RAM 106 also includes a memory section 132 which functions as a counter. The counter 132 counts the crank position signal SCP for a predetermined period of time, for example, 12.5 msec and outputs data indicative of engine rotation frequency corresponding to the count of the counter. The data will be referred to as engine rotation frequency data. The engine rotation frequency data outputted from the counter 132 are fed to the memory section 134 of the RAM 106 to update the content of the memory section 134. Furthermore, the RAM 106 includes a memory section 136. The memory section 136 stores digital data indicating the intake air flow rate into which the analog signal outputted from the airflow sensor 12 is converted by an analog/digital converter 138 included in the input/output interface 102.

FIG. 9 illustrate an ignition timing calculation program stored in the memory section 141 of the ROM 108. The ignition timing calculation program is executed as the background job of the CPU 104 at predetermined times.

At the first block 1002, the flag register FLCR indicating the starter being ON is checked. If the starter switch 10 is ON and thus the starter flag FLCR is in its set condition, then the program proceeds to the block 1004 where an ignition timing value is calculated in a normal manner for engine cranking.

FIG. 9 shows an ignition timing calculation program stored in the memory section 140 of the ROM. The ignition timing calculation program is executed as the background job of the CPU 104 at predetermined times.

At the block 1002 of this ignition timing calculation program, a check is made as to whether or nor the flag FLCR indicating the starter being ON is set. As described above, the flag FLCR indicating the starter being ON is set when the starter switch 10 is On. If the flag FLCR is detected as being set at the block 1002, then the program proceeds to the block 1004 where an ignition timing value is calculated in a normal manner for engine cranking. On the other hand, if the flag FLCR indicating the starter being ON is detected as being reset at the block 1002, then the program proceeds to the block 1006 where a check is made for the idling flag FLID set/reset in the memory section 130 of the RAM 106. If the idling flag FLID is not set, then it means that the engine operates in a normal condition and the program proceeds to the block 1008 where the CPU reads engine rotation frequency N and intake air flow rate Q from the memory sections 134 and 136, respectively, and then calculates an ignition timing value in a known manner. The ignition advance is determined by looking up the three-dimensional table of FIG. 3 as a function of engine rotation frequency N and intake air flow rate Q.

If it is detected at the block 1006 that the idling flat FLID is set, then the program proceeds to the block 1010 where the CPU determines an ignition advance value by looking up the two-dimensional table stored in the memory section 124 of the RAM 106 as a function of engine rotation frequency and determines the ignition timing based upon the determined advance value. Following this, at the block 1012, the subroutine of FIG. 10 is executed to determine an ignition advance correction value corresponding to the difference between the demand torque and the actual torque so as to correct the ignition timing.

Figure 10:
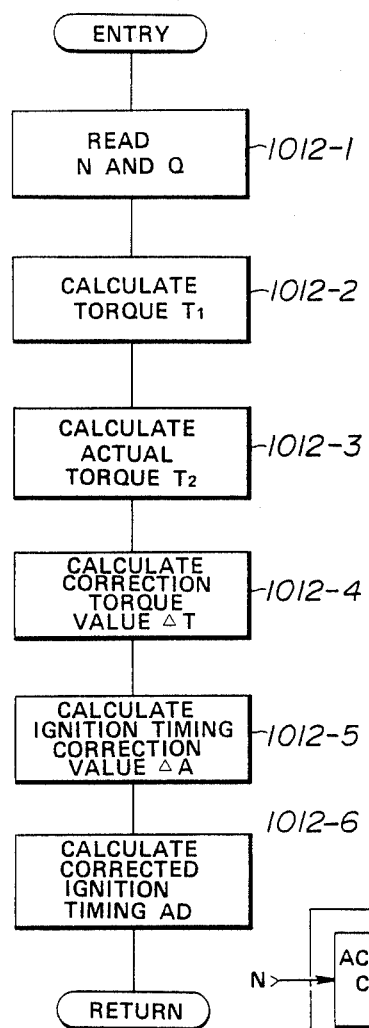
FIG. 10 is a flow chart showing the subroutine of the ignition timing correction program of FIG. 9.

In the subroutine of FIG. 10, at the block 1012-1, the CPU reads data indicative of engine rotation frequency and induction air flow rate Q from the memory sections 134 and 136 of the RAM 106. Following this, at the block 1012-2, the CPU calculates a value T1 corresponding to the torque demanded for the engine (that is, a value in direct proportion to the demand cylinder intake air flow rate Qa1) as a function of the read engine rotation frequency N and intake air flow rate Q as:

$$T1 = K \times C/N$$

where K is a constant.

At the block 1012-3, the CPU calculates an actual torque value T2 (directly proportional to the actual cylinder air flow rate Qa2) based upon the actual torque value T2' measured during the last cycle and the demand torque T1 calculated at the block 1012-2 as:

$$T2 = (1-\alpha) \times T2' + \alpha \times T1$$

where $\alpha$ is a constant which is preferably represented as $\eta = v/V$ where $\eta$ is the volumetric efficiency, v is the cylinder stroke volume, and V is the induction passage volume.

At the block 1012-4, a correction torque value $\Delta T$ is calculated based upon the demand torque T1 and the actual torque T2 as:

$$\Delta T = T1 - T2$$

At the block 1012-5, an ignition timing correction value A is calculated based upon the correction torque value T and a predetermined function as:

$$\Delta A = F(\Delta T)$$

For example, the function F may be such as function as to fulfill the condition, that is, $F(\Delta T) \geq 0$ when $\Delta T \geq \Delta T1$, $F(\Delta T) = 0$ when $\Delta T1 \Delta T > \Delta T2$, and $F(\Delta T) \leq 0$ when $\Delta T \leq \Delta T2$, wherein $\Delta T1$ is a constant equal to or greater than 0 and $\Delta T2$ is a constant equal to or less than 0.

The correction torque value $\Delta T$ may be calculated as:

$$\Delta T = T1/T2$$

wherein the constants T1 and T2 of the function F used in calculating the ignition timing correction value A fulfill the condition, that is, $\Delta T1 \geq 1.0$ and $0 \leq \Delta T2 \leq 1.0$.

At the following block 1012-6, a corrected ignition timing AD is calculated based upon the ignition timing correction value $\Delta A$ calculated at the block 1012-5 and the set ignition timing A calculated at the block 1010 of the program of FIG. 9 as:

$$AD = \Delta A + A$$

The corrected ignition timing AD is stored in the memory section 140 of the RAM 106 which functions as an advance register. It is to be noted that the corrected ignition timing AD may be calculated as:

$$AD = \Delta A \times A$$

where the function F is such a function as to fulfill the condition, that is, $F(\Delta T) \geq 1.0$ when $\Delta T \geq \Delta T1$, $F(\Delta T) = 1.0$ when $\Delta T1 > \Delta T > \Delta T2$, and $0 \leq F(\Delta T) \leq 1.0$. $\Delta T1 \geq 0$ and $\Delta T2 \leq 0$ when the corrected torque value $\Delta T$ is calculated as $\Delta T = T1 - T2$ and $\Delta T1 \geq 1.0$ and $\Delta T2 \leq 1.0$ when the value $\Delta T$ is calculated as $\Delta T = T1/T2$.

The controller 100 calculates the ignition timing AD in the manner described above and stores it in the advance register 140 of the RAM 106. The controller produces ignition timing data ADD based upon the stored value during execution of an interrupt routine (not shown) for each cycle in accordance with the crank reference signal SCR fed thereto from the crank angle sensor 14, sets the ignition timing data into the advance register 110 of FIG. 4 at the block 2002 of the ignition timing control program of FIG. 11, and updates the actual torque value to T2 (T2'←T2) at the block 2004.

As described above, the ignition timing control system corrects the ignition timing in accordance with the difference between the actual torque and the ideal torque during engine idling in a manner to zero the difference and thus can eliminate the time lag of the torque produced on the engine relative to an engine rotation frequency change.

Figure 12:
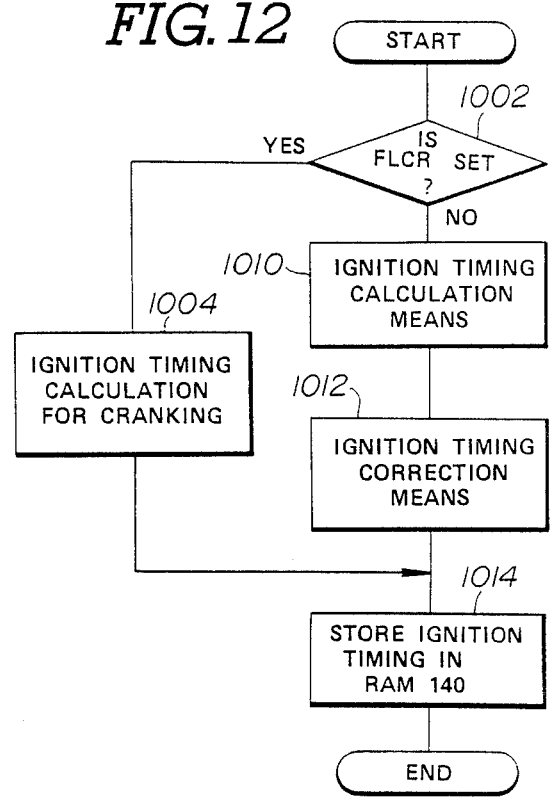
FIG. 12 is a flow chart showing a modification of the programs of FIGS. 9 and 11 and showing the program executed in correcting and controlling the ignition timing.

FIG. 12 is a flow diagram showing one example of ignition timing calculation program executed by the control circuit of another embodiment of the present invention.

In this embodiment, the block 1006 of FIG. 9 where a check is made as to whether or not the engine is idling in order to correct the ignition timing only during engine idling is eliminated so that the ignition timing can be corrected except during engine cranking.

This provides an additional advantage such as to reduce the shock produced when a load such as air conditioner is added while the device is running at a constant speed.

Figure 13:
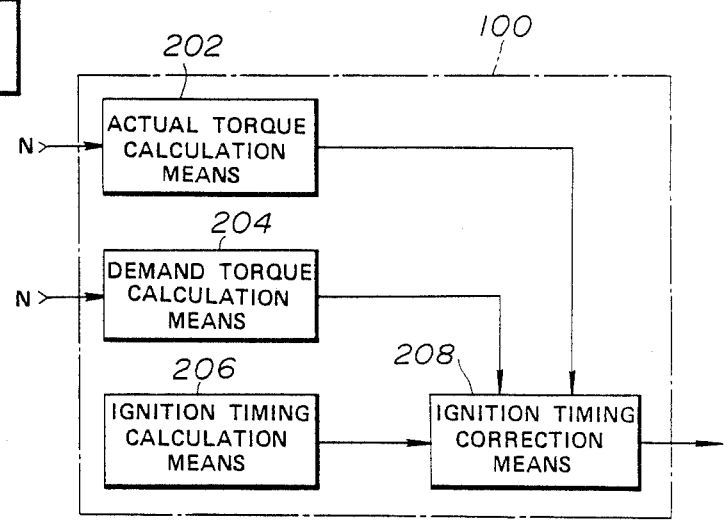
FIG. 13 is a block diagram used in explaining the function of the engine output torque control system of the second embodiment of the present invention.

FIG. 13 shows an internal combustion engine output torque control system according to the second embodiment of the present invention. In the embodiment of FIG. 13, the controller 100 of the output torque control system includes an actual torque calculation means 202, a demand torque calculation means 204, an ignition timing calculation means 206, and an ignition timing correction means 208, as described in connection with the first embodiment.

The actual torque calculation means 202 calculates a value for the actual torque actually produced on the engine as a function of engine rotation frequency. Like the actual torque correction means 202, the demand torque calculation means 204 calculates a demand torque value corresponding to engine load as a function of engine rotation frequency. The ignition timing calculation means 206 uses one of the advance tables of FIGS. 2 and 3 selectively to determine the ignition advance as a function of engine rotation frequency and intake air flow rate and determines the ignition timing based upon the advance value and the crank reference signal fed thereto from the crank angle sensor indicating the reference position of the crankshaft. Like the first embodiment, a correction torque value is determined in accordance with the difference between the actual torque and the demand torque. A correction value for the ignition advance is determined in accordance with the correction torque value. The ignition timing determined by the ignition timing calculation means is corrected in accordance with the determined ignition advance correction value.

Figure 14:
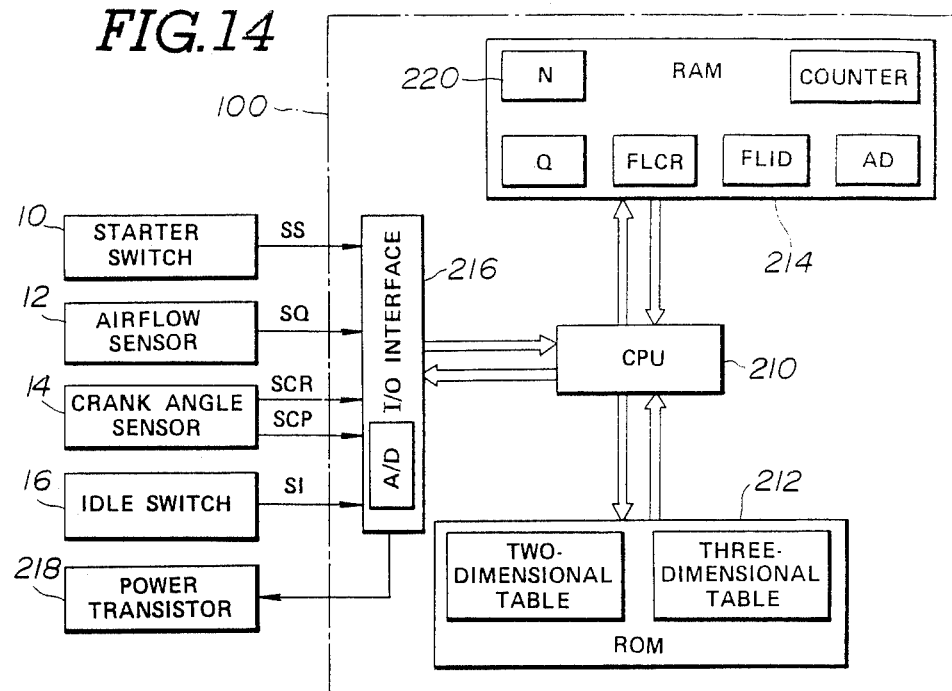
FIG. 14 is a block diagram showing the control circuit of the torque control system of the second embodiment of the present invention.

The arrangement of the controller 100 of the second embodiment and the ignition timing correction value determination program will be described with reference to FIGS. 14 and 15.

The controller 100 of this embodiment have the same function as the circuit including the ignition timing calculation means 206, the actual torque calculation means 202, the demand torque calculation means 204, and the ignition timing correction means 208 of FIG. 13 and comprises a microcomputer including a CPU 210, a ROM 212, a RAM 214, and an I/O 216 including an A/D converter. The controller calculates an actual torque value, a demand torque value, and an ignition timing value, corrects the ignition timing, and controls the ignition timing in accordance with the program stored in the ROM 212.

The ROM 212 stores the advance table of FIG. 3, the advance table of FIG. 3, data required in calculating a value for the actual torque actually produced on the engine and a value for the demand torque demanded for the engine, and data required in correcting the ignition timing.

As described in connection with the first embodiment of FIG. 4, a circuit which controls the power transistor 218 of the I/O 216 includes an advance resister, a counter which is reset to count the crank position (for example, 1°) signal in response to a reset pulse, and a comparator which turns the power transistor 218 off when the count of the counter reaches the ignition timing data set in the advance register.

The idle switch may be replaced with a throttle switch operable to produce a signal when the throttle valve is at its closed position.

The operation of the circuit arranged according to this embodiment will be described. First of all, the principle of the ignition timing correction made in the ignition timing control system will be described.

Referring to FIG. 7, when the engine rotation frequency N is changed steppedly from 700 rpm to 600 rpm during engine idling where the throttle valve is at its closed position and the air-fuel ratio is about 14.5, the induction passage air flow rate Q per unit time, the cylinder intake air flow rate Qa, and the output torque T vary as shown in FIGS. 7(B) to 7(D), respectively.

That is, the induction passage air flow rate Q is constant regardless of the engine rotation frequency N since the flow is sonic during engine idling.

The cylinder intake air flow rate Qa varies with a time lag of first order relative to a change of the engine rotation frequency N due to the influence of the induction passage volume and the cylinder stroke volume.

The output torque T varies with a time lag of first order relative to a change of the engine rotation frequency N due to the time lag of first order of the cylinder intake air flow rate Qa.

The dotted lines of FIGS. 7(C) and 7(D) indicate ideal response conditions where the cylinder intake air flow rate Qa and the output torque T vary with no time lag relative to variations in the engine rotation frequency N.

On the other hand, the relationship between the ignition timing and the output torque is shown in FIG. 8. That is, the output torque varies as the ignition timing varies.

Thus, the ignition timing is corrected in accordance with the difference between the demand torque T1 indicated by the dotted line of FIG. 7(D) and the actual torque T2 indicates by the solid line, that is, the correction torque value $\Delta T$ indicated in FIG. 7(E).

The correction torque value $\Delta T$ is calculated to correct the ignition timing in the following manner:

First of all, a fairly good approximation of the ideal cylinder intake air flow rate Qa1 is provided as:

$$Qa1 = 2Q/CN$$

where C is the number of cylinders, and a fairly good approximation of the actual cylinder intake air flow rate Qa2 is provided as:

$$Qa2 = (1-\alpha) \times Qa2' + \alpha \times 2Q/CN$$

where $Qa2'$ is the cylinder intake air flow rate Qa2 measured during the last cycle, $\alpha$ is a constant represented as $\alpha = \eta v/V$ where $\eta$ is the volumetric efficiency, v is the cylinder stroke volume, and V is the induction passage volume.

Assuming now that the throttle valve is at its closed position, the induction passage air flow rate Q is constant as described above. That is, Q = a constant If K is set as K=2Q/C, the ideal cylinder intake air flow rate Qa1 is represented as:

$$Qa1 \approx K \times 1/N$$

The actual cylinder intake air flow rate Qa2 is represented as:

$$Qa2 \approx (1-\alpha) \times Qa2' + \alpha \times K \times 1/N$$

If the air-fuel ratio is constant, the torque T produced on the engine is considered as being in direct proportion to the cylinder intake air flow rate Qa. Thus, the difference (correction torque value) $\Delta T$ between the demand torque T1 and the actual torque T2 is in direct proportion to the difference between the demand cylinder intake air flow rate Qa1 and the actual cylinder intake air flow rate Qa2. That is, $$\Delta T \propto Qa1 - Qa2$$

Thus, a desired advance value which is used to correct the ignition advance to obtain a correction torque can be calculated as a function of the difference (Qa1−Qa2) between the demand cylinder intake air flow rate Qa1 and the actual cylinder intake air flow rate Qa2. In such a manner, the time lag of change of the cylinder intake air flow rate, that is, the torque can be corrected.

The controller 100 of the second embodiment executes the ignition timing calculation program of FIG. 9 in determining the ignition timing in the same manner as described in connection with the first embodiment.

Figure 15:
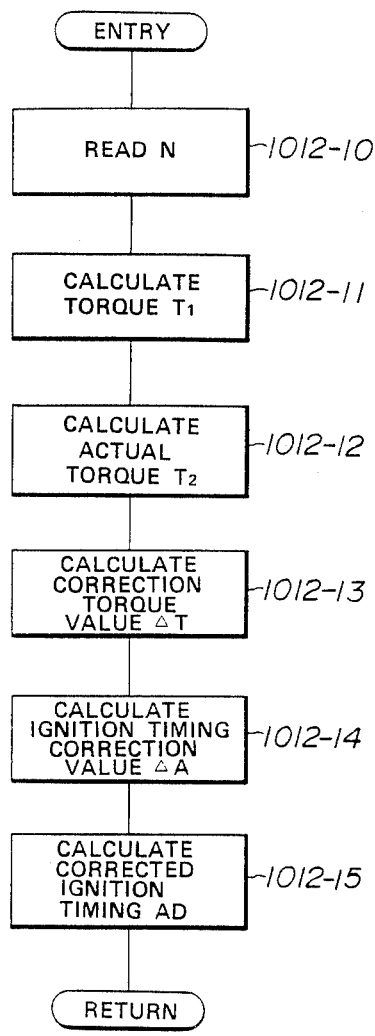
FIG. 15 is a flow chart of the ignition timing correction program executed by the control circuit of FIG. 14.

FIG. 15 is a flow diagram showing the ignition timing correction subroutine of FIG. 9.

In this figure, at the block 1012-10, data indicative of engine rotation frequency N is read out of the memory section 220 of the RAM 214. At the block 1012-11, the reciprocal (1/N) of the engine rotation frequency N is calculated and the demand torque T1 which is in direct proportion to the demand cylinder intake air flow rate Qa1 is calculated based upon the reciprocal (1/N) as:

$$T1 = K \times 1/N$$

where K is a constant.

At the block 1012-12, the actual torque T2 which is in direct proportion to the actual cylinder intake air flow rate Qa2 is calculated based upon the actual torque value T2' measured during the last cycle and the demand torque value T1 as:

$$T2 = (1-\alpha) \times T2' + \alpha \times T1$$

where $\alpha$ is a constant represented as $\alpha = \eta v/V$ where $\eta$ is the volumetric efficiency, v is the cylinder stroke volume, and V is the induction passage volume.

At the following block 1012-13, a correction torque value $\Delta T$ is calculated based upon the demand torque T1 and the actual torque T2 as:

$$\Delta T = T1 - T2$$

At the block 1012-4, an ignition timing correction value $\Delta A$ is calculated in accordance with a predetermined function F as:

$$\Delta A = F(\Delta T)$$

where the function F is such a function as to fulfill the condition, that is $F(\Delta T) \leq 0$ when $\Delta T \leq \Delta T1$, $F(\Delta T) = 0$ when $\Delta T1 > \Delta T > \Delta T2$, and $F(\Delta T) \leq 0$ when $\Delta T \leq \Delta T2$, wherein $\Delta T1$ is a constant equal to or greater than zero and $\Delta T2$ is a constant equal to or less than zero.

The correction torque value $\Delta T$ may be calculated as:

$$\Delta T = T1/T2$$

In this case, the constants $\Delta T1$ and $\Delta T2$ of the function F used in calculating the ignition timing correction value $\Delta A$ should satisfy the conditions of $\Delta T1 \leq 1.0$ and $0 \leq \Delta T2 \leq 1.0$.

Following this, a corrected ignition timing AD is calculated based upon the ignition timing correction value $\Delta A$ calculated in the above manner and the ignition timing A calculated at the block 1010 of the program of FIG. 9 as:

$$AD = \Delta A + A$$

The corrected ignition timing AD is stored in the RAM 220 at an address ADVL as described in connection with FIG. 9.

The corrected ignition timing AD may be calculated as:

$$AD = \Delta A \times A$$

where the function F is such a fraction as to fulfill the condition, that is, $F(\Delta T) \leq 1.0$ when $\Delta T \leq \Delta T1$, $F(\Delta T) - 1.0$ when $\Delta T1 > \Delta T > \Delta T2$, and $0 \leq F(\Delta T) \leq 1.0$ when $\Delta T \leq \Delta T2$. $\Delta T1$ is a constant equal to or greater than 0 and $\Delta T2$ is a constant equal to or less than 0 if the correction torque value $\Delta T$ is calculated as:

$$\Delta T = T1 - T2$$

and $\Delta T1$ is a constant equal to or greater than 1.0 and $\Delta T2$ is a constant equal to or less than 1.0 if the correction torque value is calculated as:

$$\Delta T = T1/T2$$

The controller 100 calculates the ignition timing AD in the manner described above and stores it in the RAM. The controller produces ignition timing data ADD based upon the stored value during exception of an interrupt routine (not shown) for each cycle in accordance with the crank reference signal fed thereto from the crank angle sensor, sets the ignition timing data into the advance register of FIG. 4, as shown in FIG. 11, and updates the actual torque value from T2' (T2'←T2).

FIGS. 16 to 20 shows a third embodiment of the internal combustion engine of the present invention. The output torque control system of the third embodiment includes a difference calculation means 302 for calculating a value corresponding to the difference between the actual torque and the demand torque in accordance with engine rotation frequency, an ignition timing calculation means 304 for determining an advance value by looking up the advance table of FIG. 2 or 3 as a function of engine rotation frequency and intake air flow rate and determining an ignition timing based upon the advance value, and an ignition timing correction means 306 for determining an ignition advance correction value based upon the difference calculated by the difference calculation means 302 and correcting the ignition timing determined by the ignition timing calculation means 304 based upon the advance correction value.

The difference calculation means 302 calculates a difference between the actual torque and demand torque, that is, a torque correction value in the following manner:

First of all, a fairly approximation of the demand cylinder intake air flow rate Qa1 is provided as:

$$Qa1 = 2Q/CN$$

where C is the number of the cylinders, and a fairly good approximation of the actual cylinder intake air flow rate Qa2 is provided as:

$$Qa2 = (1-\alpha) \times Qa2' + \alpha \times 2Q/CN$$

where Qa2' is the cylinder intake air flow rate Qa2 measured during the last cycle, $\alpha$ is a constant represented as $\alpha = \eta v/V$ where $\eta$ is the volumetric efficiency, v is the cylinder stroke volume, and V is the induction passage volume.

Assuming now that the throttle valve is at its closed position, the induction passage air flow rate Q is constant as described above. That is, Q = a constant If k is set as K = Q/2, the demand cylinder intake air flow rate Qa1 is represented as:

$$Qa1 \approx K \times 1/N$$

The actual cylinder intake air flow rate Qa2 is represented as:

$$Qa2 \approx (1-\alpha) \times Qa2' + \alpha \times K \times 1/N$$

If the air-fuel ratio is constant, the torque T produced by the engine is considered as being in direct proportion to the cylinder intake air flow rate Qa. Thus, the demand torque T1 is in direct proportion to the demand cylinder intake air flow rate Qa1 and the actual torque T2 is in direct proportion to the actual cylinder intake air flow rate Qa2. That is, $$T1 \propto Qa1 \approx K \times 1/N$$

$$T2 \propto Qa2 \approx (1-\alpha) \times Qa2' + \alpha \times K \times 1/N$$

It can be seen from the above equations that the demand torque T1 can be calculated in accordance with the reciprocal (1/N) of the engine rotation frequency and the actual torque T2 can be calculated in accordance with the weighted average of the reciprocal (1/N) of the engine rotation frequency N.

Thus, fairly approximations of the reciprocal (1/T1) of the demand torque T1 and the reciprocal (1/T2) of the actual torque T2 are provided as:

$$1/T1 = K1 \times N$$

$$1/T2 = (1-\alpha_1) \times (1/T2)' + \alpha 1 \times K1 \times N$$

Assuming that the reciprocal (1/T1) of the demand torque T1 is NS and the reciprocal (1/T2) of the actual torque T2 is $\overline{NS}$, the following equations are given:

$$NS = K1 \times N$$

$$\overline{NS} = (1-\alpha_1) \times \overline{NS}' + \alpha 1 \times K1 \times N$$

For example, FIGS. 18(A) and 18(B) show variations in the reciprocal NS of the demand torque of FIG. 7 and the reciprocal $\overline{NS}$ of the actual torque.

FIG. 18(C) shows variations in the difference $\Delta NS$ between the reciprocal NS of the demand torque and the reciprocal $\overline{NS}$ of the actual torque.

As can be seen from FIGS. 18(C) to 18(E), the difference $\Delta NS$ varies substantially in the same figure as the correction torque value $\Delta T$. That is, $$\Delta T \propto \Delta NS$$

It is, therefore, possible to correct the time lag of the cylinder intake air flow rate change, that is, the time lag of the torque change by calculating the difference $\Delta NS$, that is, a value directly proportional to the correction torque $\Delta T$, converting the result into a corresponding ignition timing in accordance with a predetermined function, and correcting the ignition timing by the correction value to control the ignition timing.

The difference $\Delta NS$ which corresponds to the difference (correction torque) $\Delta T$ between the demand torque T1 and the actual torque T2 may be calculated as the difference ($\overline{NS}$ − NS) between the reciprocal NS of the demand torque and the reciprocal $\overline{NS}$ of the actual torque or as a ratio ($\overline{NS}/NS$) of the reciprocal NS of the demand torque and the reciprocal $\overline{NS}$ of the actual torque since NS = 1/T1 and $\overline{NS}$ = 1/T2.

Figure 19:
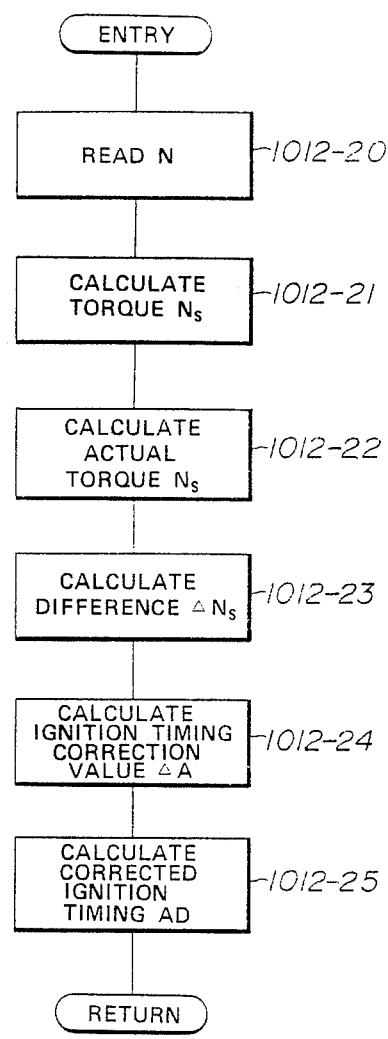
FIG. 19 is a flow chart of the ignition timing correction program executed by the control circuit of FIG. 18.
Figure 18:
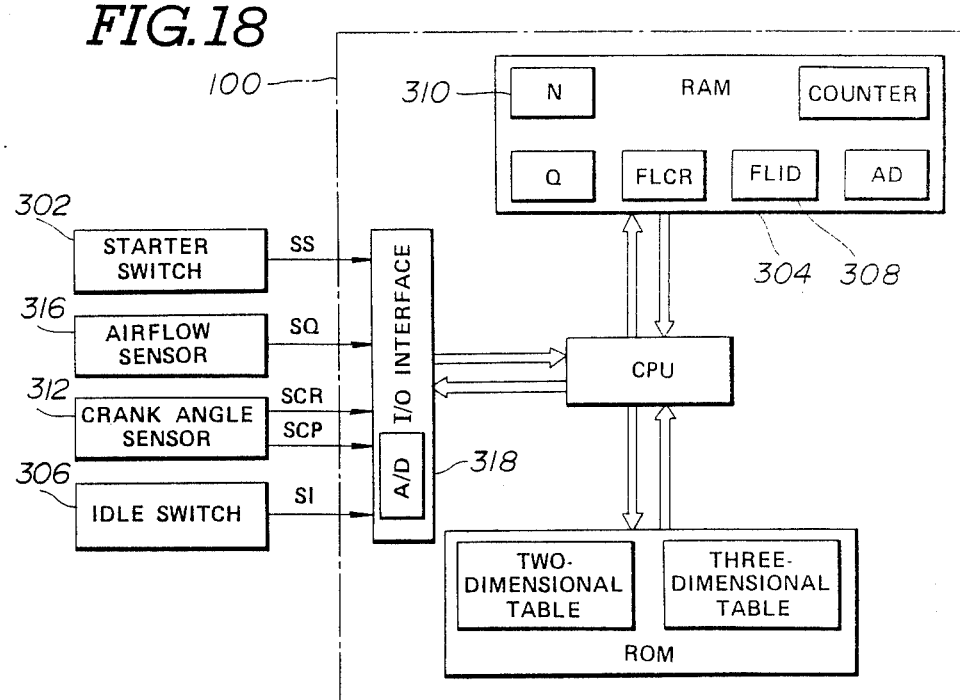
FIG. 18 is a block diagram showing the control circuit of the output torque control system of the third embodiment of the present invention.
Figure 16:
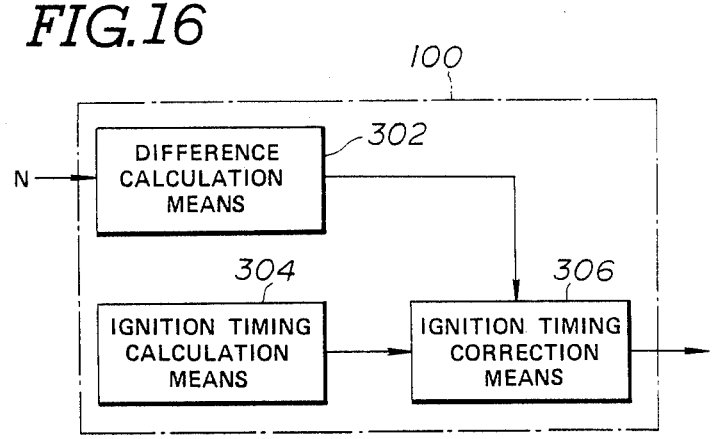
FIG. 16 is a block diagram used in explaining the function of the engine output torque control system of the third embodiment of the present invention.
Figure 17:
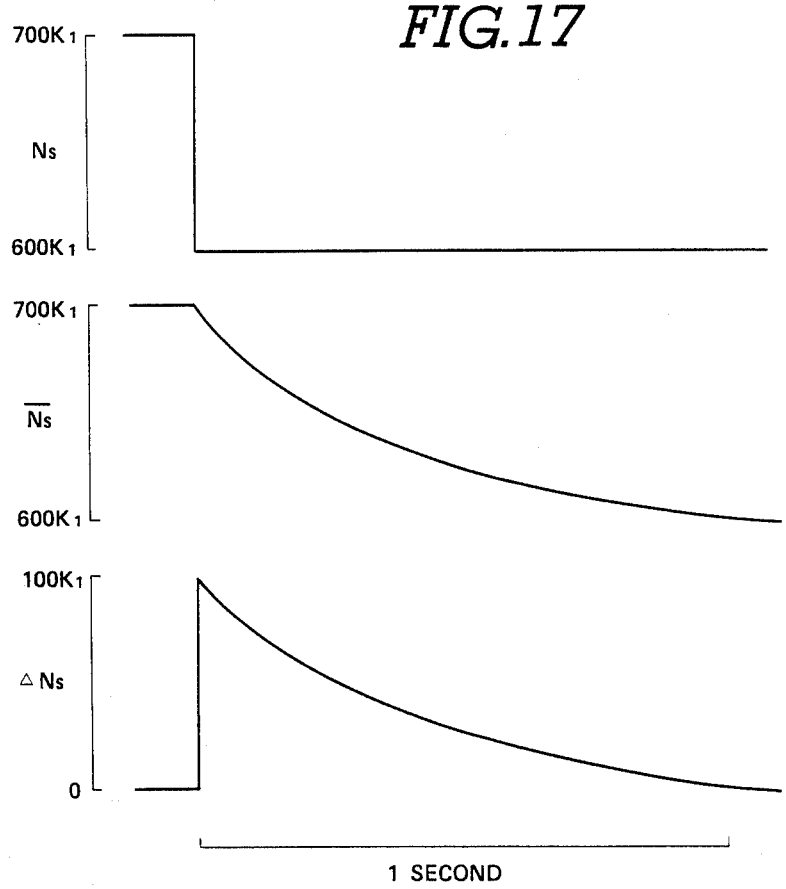
FIG. 17 is a chart showing changes in the reciprocal of the demand torque (NS), the reciprocal of the actual torque (NS), and a difference (ΔNS)

The ignition timing control operation of the controller 100 of FIG. 1 will be described with reference to FIGS. 18 and 19.

The controller 100 stores the starter signal fed thereto from the starter switch 302 into a predetermined memory section 306 of the RAM 304 and the idle signal fed thereto from the idle switch 306 into a predetermined memory section 308 of the RAM 304.

The value at which the crank position signal fed from the crank angle sensor 312 is counted for a predetermined time, for example, 12.5 msec is stored as a value for engine rotation frequency N into a section 310 of the RAM 304.

The RAM also has a section 314 into which a value for induction passage air flow rate Q is stored. The intake air flow rate signal is applied from the airflow meter 316 to the A/D converter of the I/O 318 which converts it into digital form.

The controller of the third embodiment executes the ignition timing calculation program of FIG. 9. FIG. 19 shows a subroutine which is executed at the block 1012 of the program of FIG. 9.

In the figure, at the block 1012-20, data of engine rotation frequency N are read out of the memory section 310 of the RAM. At the block 1012-21, the reciprocal NS of the demand torque is calculated based upon the engine rotation frequency N as:

$$NS = K1 \times N$$

where K is a constant.

At the block 1012-22, the reciprocal $\overline{NS}$ of the actual torque is calculated based upon the reciprocal NS of the demand torque and the reciprocal $\overline{NS}'$ of the actual torque measured during the last cycle as:

$$\overline{NS} = (1-\alpha 1) \times \overline{NS}' + \alpha 1 \times NS$$

where $\alpha 1$ is a constant represented as $\alpha 1 \approx \eta v/V$ where $\eta$ is the volumetric efficiency, v is the cylinder stroke volume, and V is the induction passage volume.

At the following block 1012-20, the difference $\Delta NS$ corresponding to the correction torque value T is calculated based upon the demand torque NS and the actual torque $\overline{NS}$ as:

$$\Delta NS = \overline{NS} - NS$$

At the block 1012-24, an ignition timing correction value $\Delta A$ is calculated in accordance with a predetermined function F as:

$$\Delta A = F(\Delta NS)$$

where the function F is such a function as to fulfill the condition, that is, $F(\Delta NS) \geq 0$ when $\Delta NS \geq \Delta NS1$, $F(\Delta NS) = 0$ when $\Delta NS1 > \Delta NS > \Delta NS2$, and $F(\Delta NS) \leq 0$ when $\Delta NS \leq \Delta NS2$ wherein $\Delta NS1$ is a constant equal to or greater than 0 and $\Delta NS2$ is a constant equal to or less than 1.

The difference $\Delta NS$ corresponding to the correction torque value $\Delta T$ may be calculated as:

$$\Delta NS = \overline{NS}/NS$$

In this case, the constants $\Delta NS1$ and $\Delta NS2$ of the function F used in calculating the ignition timing correction value $\Delta A$ should satisfy the condition of $\Delta NS1 \geq 1.0$ and $0 \leq \Delta NS2 \leq 1.0$.

Following this, a corrected ignition timing AD is calculated based upon the ignition timing correction value $\Delta A$ calculated in the above manner and the ignition timing A calculated at the block 1010 of the program of FIG. 9 as:

$$AD = \Delta A + A$$

The corrected ignition timing AD is stored in the RAM 24 at an address ADVL as described in connection with FIG. 9.

The corrected ignition timing AD may be calculated as:

$$AD = \Delta A \times A$$

where the function F is such a function as to fulfill the condition, that is, $F(\Delta NS) \geq 1.0$ when $\Delta NS \geq \Delta NS1$, $F(\Delta NS) = 1.0$ when $\Delta NS1 > \Delta NS > \Delta NS2$, and $0 \leq F(\Delta NS) \leq 1.0$ when $\Delta NS \leq NS2$. $\Delta NS1$ is a constant equal to or greater than 0 and $\Delta NS2$ is a constant equal to or greater than when the difference $\Delta NS$ is calculated as $\Delta NS = \overline{NS} - NS$. The constant $\Delta NS1$ is equal to or greater than 1.0 and the constant $\Delta NS2$ is equal to or less than 1.0 when the difference is calculated as $\Delta NS = \overline{NS}/NS$.

The controller calculates the ignition timing AD in the manner described above and stores it in the RAM. The controller produces ignition timing data based upon the stored value during execution of an interrupt routine (not shown) for each cycle in accordance with the crank reference signal fed thereto from the crank angle sensor, sets the ignition timing data into the advance register of FIG. 4, and updates the reciprocal $\overline{NS}'$ of the actual torque ($\overline{NS}' \leftarrow \overline{NS}$).

Although, in this embodiment, the reciprocal $\overline{NS}$ of the actual torque is calculated as the weighted average of the engine rotation frequency N, it is to be noted that it may be calculated as the moving average of the engine rotation frequency N.

In this case, the engine rotation frequency N is sampled and stored in the RAM 304 at predetermined time intervals so as to provide data including the last n values for engine rotation frequency N.

The actual torque value $\overline{NS}$ is calculated as the moving average of the engine rotation frequency N as:

$$\overline{NS} = \frac{K_1}{n} \sum_{i=1}^{n} (Nn)$$

Figure 20:
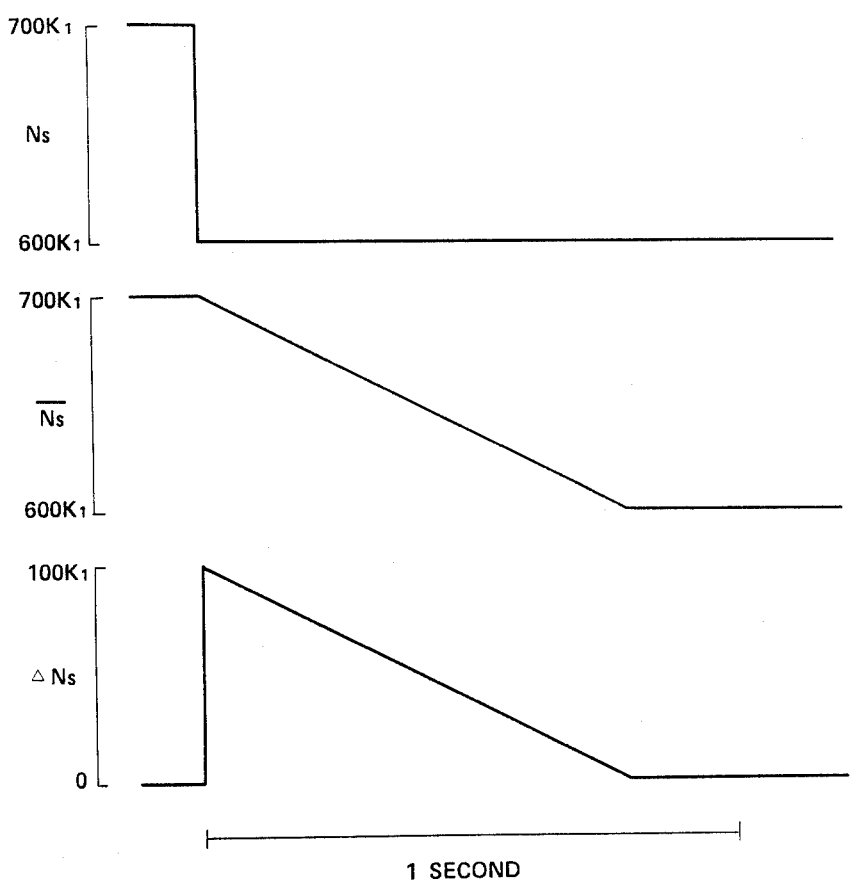
FIG. 20 is a chart showing changes in the reciprocal of the demand torque (NS), the reciprocal of the actual torque (NS), and a difference (ΔNS).

FIG. 20 shows the figures of variations of the reciprocal NS of the demand torque, the reciprocal $\overline{NS}$ of the actual torque, and the difference $\Delta NS$ in this case.

EFFECT

As described above, the present invention can correct the time lag of the engine torque due to a time lag of the cylinder intake air flow rate change relative to an engine rotation frequency change so as to permit transmission gear change and clutch position change without engine stall.

What is claimed is:

1. An internal combustion engine output torque control system comprising:
    first means for determining a basic spark advance angle based upon predetermined control parameters including an intake air flow rate, the first means being operable to determine an ignition timing in accordance with the relationship between said spark advance angle and the reference position of the engine crankshaft;
    second means for calculating a difference between the torque demanded for the engine and the actual torque actually produced by the engine based on engine operating parameters including engine revolution speed, the second means being operable to determine said engine demand torque based upon said engine revolution speed and said intake air flow rate and said actual torque based upon the demand torque and the actual torque measured during the last cycle of the engine, and to determine a correction value used in correcting the ignition timing in a manner to reduce the difference between the actual torque and the demand torque; and
    third means for correcting the ignition timing determined by the first means for the correction value determined by the second means to determine a corrected ignition timing, the third means being operable to generate an ignition signal at a predetermined timing corresponding to the corrected ignition timing.

2. The control system as claimed in claim 1, which includes detection means for detecting an engine cranking condition and producing a signal indicative of the engine cranking condition when it detects the engine cranking condition, and fourth means responsive to the engine cranking condition indicative signal for preventing the operation of the second means.

3. The control system as claimed in claim 2, wherein the fourth means includes idling detection means for detecting an engine idling condition and producing a signal indicative of the idling condition when it detects the engine idling condition.

4. An internal combustion engine output torque control system comprising:
  first means for determining a basic spark advance angle based upon predetermined control parameters, the first means being operable to determine an ignition timing in accordance with the relationship between said spark advance angle and the reference position of the engine crankshaft;
  second means for calculating a difference between the torque demanded for the engine and the actual torque produced by the engine based on engine revolution speed and induction passage air flow rate, the second means being operable to determine a correction value used in correcting the ignition timing in a manner to reduce the difference between the actual torque and the demand torque; and
  third means for correcting the ignition timing determined by the first means for the correction value determined by the second means to determine a corrected ignition timing, the third means being operable to generate an ignition signal at a predetermined timing corresponding to the corrected ignition timing.

5. An internal combustion engine output torque control system comprising:
  an engine revolution speed sensor for producing an engine revolution speed indicative of the engine revolution speed;
  an intake air flow sensor for producing an intake air flow rate signal indicative of the amount of air delivered to the engine;
  first means for determining a basic spark advance signal based upon predetermined control parameters, the first means being operable to determine an ignition timing in accordance with the relationship between said spark advance angle and the reference position of the engine crankshaft;
  second means for calculating a difference between the torque demanded for the engine and the actual torque actually produced by the engine based on engine operating parameters including engine revolution speed, the second means being operable to determine said engine demand torque based upon said engine revolution speed signal value and said intake air flow rate indicative signal value, and to determine a correction value used in correcting the ignition timing in a manner to reduce the difference between the actual torque and the demand torque; and
  third means for correcting the ignition timing determined by the first means for the correction value determined by the second means to determine a corrected ignition timing, the third means being operable to generate an ignition signal at a predetermined timing corresponding to the corrected ignition timing.

6. An internal combustion engine ignition timing control system comprising an ignition timing calculation means for calculating an ignition timing in accordance with engine operating conditions, actual torque calculation means for calculating an actual torque value for the torque actually produced by the engine on the basis of an engine revolution speed and an intake air flow rate, demand torque calculation means for calculating a demand torque value for the torque demanded for the engine, and ignition timing correction means for correcting the ignition timing calculated by the ignition timing calculation means based upon the result of calculation of the actual torque calculation means and the result of calculation of the demand torque calculation means.

7. The internal combustion engine ignition timing control system as claimed in claim 6, wherein the demand torque calculation means is operable to calculate the demand torque value based upon engine revolution speed and induction passage air flow rate.

8. An internal combustion engine ignition timing control system comprising an ignition timing calculation means for calculating an ignition timing in accordance with engine operating conditions, actual torque calculation means for calculating an actual torque value for the torque actually produced by the engine, demand torque calculation means for calculating a demand torque value for the torque demanded for the engine on the basis of an engine revolution speed and an intake air flow rate, and ignition timing correction means for correctng the ignition timing calculated by the ignition timing calculation means based upon the result of calculation of the actual torque calculation means and the result of calculation of the demand torque calculation means.

* * * * *